April 18, 1967     R. A. SHOULTS     3,314,318
MICRO-SOCKET HAVING A DRIVE COUPLING MEANS
AND INTERNAL CONNECTING BAR THEREFOR
Filed Dec. 7, 1965

Robert A. Shoults,
INVENTOR.

BY Harry M. Saragovitz
Edward J. Kelly
Herbert Berl
James F. Deaton

United States Patent Office 3,314,318
Patented Apr. 18, 1967

3,314,318
MICRO-SOCKET HAVING A DRIVE COUPLING MEANS AND INTERNAL CONNECTING BAR THEREFOR
Robert A. Shoults, 1303 Atlanta St., Cullman, Ala. 35055
Filed Dec. 7, 1965, Ser. No. 512,249
4 Claims. (Cl. 81—177)

The invention described herein may be manufactured and used by or for the Government for governmental purposes without the payment of any royalty thereon.

This invention relates to a socket which is designed for making adjustments in tight places and for transmitting a maximum amount of torque, for example, inserting igniter squibs in rocket engines.

In today's missile systems, problems have developed which must be solved to enable our nation to progress in the space race. Instrumentation in missiles is very compact and close-fitting, thus presenting a serious problem in tightening and adjusting screws and nuts. Therefore, there is a need for a micro-socket that is capable of adjusting nuts and bolts in close places.

In view of this need, an object of this invention is to provide a socket capable of tightening nuts and bolts in only a small amount of space.

Another object of this invention is to provide a micro-socket with a coupling means that permits socket members to be moved longitudinal and rotated relative to each other.

A further object of this invention is to provide a socket with a driving member connected with a driven member, each member having an equally large number of inter-engaging teeth.

A still further object of this invention is to provide the socket driving and driven members with tight fitting teeth that are capable of transmitting a maximum amount of torque.

In accordance with this invention, a micro-socket is provided that has a driving member and a driven member. The driving member has radially outwardly directed teeth on one end for mating engagement with radially inwardly directed teeth on the driven member to provide a micro adjusting means between the driving and driven members. Coupling means couples the driving and driven members for limited longitudinal movement relative to each other and for unlimited rotational movement relative to each other.

In the accompanying drawing forming a part of this specification, and in which like numerals are employed to designate corresponding parts throughout the same:

Figure 1:
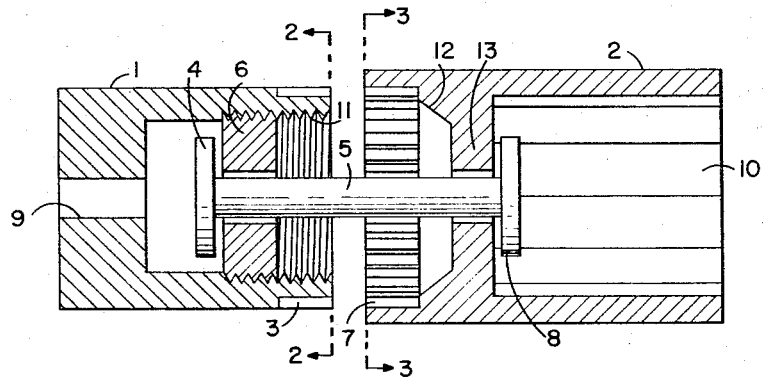
FIGURE 1 is a sectional view of a micro-socket with the members thereof in a disengaged position.
Figure 2:
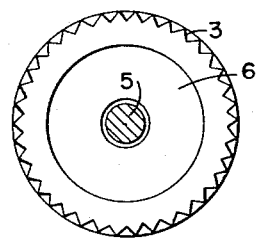
FIGURE 2 is a sectional view taken along line 2—2 of FIGURE 1.
Figure 3:
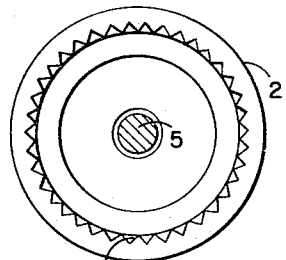
FIGURE 3 is a sectional view taken along line 3—3 of FIGURE 1.

The invention may be better understood by referring to the drawing in which, FIGURE 1 shows a micro-socket which has a driving member 1 and a driven member 2. Driving member 1 has an opening 9 at one end for receiving an actuating means to rotate and actuate the socket. At the other end, driving member 1 has teeth 3, 84 in number for example, to provide a positive drive means for transmitting torque to driven member 2. Also at this end, driving member 1 has a threaded bore 11. Elongated connecting member 5 has a flange 4 that is received in bore 11, and threaded member 6 secures connecting member 5 to driving member 1 for rotation relative thereto.

Driven member 2 has a polygonal-shaped opening 10 at one end for receiving a bolt head. At the other end, driven member 2 has teeth 7, equal in number to teeth 3 of driving member 1, providing positive drive means through which member 2 may be driven. Also at this end, driven member 2 has a stepped bore 12 which defines with polygonal-shaped opening 10 a shoulder 13. Elongated connecting member 5 is received in stepped bore 12, and washer 8 is pressed on or soldered to elongated connecting member 5 to connect driving member 1 to driven member 2 so as to allow limited longitudinal movement and relative rotational movement of driving member 1 relative to driven member 2.

Figure 4:
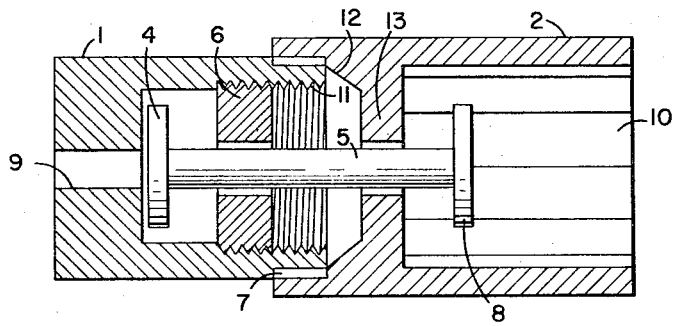
FIGURE 4 is a sectional view of a micro-socket with the members thereof in engaged position.

In operation, with the micro-socket positioned as illustrated in FIGURE 4, an actuating tool is inserted in opening 9 of driving member 1. When torque is applied to the actuating tool to cause rotation thereof, driving member 1 drives driven member 2 to adjust a bolt head received in polygonal-shaped opening 10. If additional adjustment of the bolt is needed, driving member 1 is moved longitudinally of driven member 2 until teeth 3 are disengaged from teeth 7. Then driving member 1 is rotated to reposition the driving member relative to the driven member. Teeth 3 are next re-engaged with teeth 7 to allow torque applied through driving member 1 to drive driven member 2 and actuate the bolt an additional amount. It should also be noted that the micro-socket disclosed herein may be used to adjust bolts through very small arcs of movement, for example, 5 degrees.

It is to be understood that the form of my invention, herewith shown and described, is to be taken as a preferred example of the same, and that various changes in the size, shape and arrangement of parts may be resorted to without departing from the spirit of my invention, or the scope of the subjoined claims.

I claim:

1. A micro-socket including: a driving member, said driving member having tool actuating means at one end for applying torque thereto, and a positive drive coupling means at the other end; a driven member, said driven member having a polygonal-shaped opening at one end for engaging a bolt head and a positive drive coupling means at the other end for positive driving engagement with positive drive coupling means of said driving member; and connecting means interconnecting said driving member and said driven member, said connecting means being interconnected to said driving member and said driven member such that at least one of said driving and driven members are rotatable relative to said connecting means, and said connecting means limits axial movement of said driving and driven members relative to each other such that said positive drive coupling means of said driving member and said driven member can be moved apart a sufficient distance to be disengaged and allow said driving and driven members to be rotated relative to each other by the rotary connection maintained by said connecting means to allow for angular adjustments of the driving member relative to the driven member and thereafter reengagement of said positive drive coupling means of said driving and driven members.

2. A micro-socket as set forth in claim 1, wherein said positive drive coupling means of said driving member and said driven member include a large number of inwardly directed teeth on one of said members and an equally large number of outwardly directed teeth on the other of said members, thereby providing for micro adjustments of said driving member relative to said driven member.

3. A micro-socket as set forth in claim 1, wherein said connecting means includes an inwardly directed flange in each of the driving and driven members intermediate the ends of each, an elongate member having a flange on one end thereof that overlaps the flange on one of said driving and driven members and a washer like member secured to the other end of said elongate member to confine the inwardly directed flanges between said flange on said one end and said washer like member.

4. A micro-socket as set forth in claim 3, wherein said positive drive coupling means of said driving member and said driven member include 84 inwardly directed teeth on one of said members and 84 outwardly directed teeth on the other of said members to provide for micro adjustments of said driving member relative to said driven member.

References Cited by the Examiner
UNITED STATES PATENTS

| | | | |
|---|---|---|---|
| 2,934,919 | 5/1960 | Barta et al. | 64—9 |
| 2,954,994 | 10/1960 | Beers | 287—119 |
| 2,987,334 | 6/1961 | Wendling | 287—119 |
| 3,231,955 | 2/1966 | Taylor | 91—120 X |

WILLIAM FELDMAN, *Primary Examiner.*

MILTON S. MEHR, *Examiner.*